United States Patent [19]

Zamitter

[11] Patent Number: 4,883,261
[45] Date of Patent: Nov. 28, 1989

[54] ZAMITTER BLADE SPRING

[76] Inventor: Mikhail N. Zamitter, ulitsa Aviatsii, 2/32, korpus 4, kv. 18, Kiev, U.S.S.R.

[21] Appl. No.: 241,986
[22] PCT Filed: Nov. 13, 1986
[86] PCT No.: PCT/SU86/00115
  § 371 Date: Jul. 12, 1988
  § 102(e) Date: Jul. 12, 1988
[87] PCT Pub. No.: WO88/03616
  PCT Pub. Date: May 19, 1988

[30] Foreign Application Priority Data

Feb. 20, 1984 [SU] U.S.S.R. .................. 3713661

[51] Int. Cl.$^4$ ............................................. B60B 11/00
[52] U.S. Cl. .................................. 267/158; 267/227; 267/229; 267/361; 267/160; 267/47
[58] Field of Search ............... 267/158, 227, 229, 160, 267/7, 193, 36.1, 40, 46, 47, 163, 164, 44, 69, 182

[56] References Cited

U.S. PATENT DOCUMENTS 1,188,821  6/1916  Peck ..................................... 267/227
3,190,632  6/1965  Barenyi ............................... 267/47

FOREIGN PATENT DOCUMENTS 954149   9/1974   Canada ............................ 267/47
580437  11/1924   France ............................ 267/229
8102141  8/1981   U.S.S.R. ......................... 267/158
1004685  3/1983   U.S.S.R. .
1040244  9/1983   U.S.S.R. .
1162664  6/1985   U.S.S.R. .
1188391 10/1985   U.S.S.R. .
3213    of 1892   United Kingdom ................ 267/47
152034  10/1921   United Kingdom ............... 267/36.1

Primary Examiner—Andres Kashnikow
Assistant Examiner—Mark T. Le
Attorney, Agent, or Firm—Lilling & Greenspan

[57] ABSTRACT

A Zamitter blade spring is made from a resilient blade (1), which comprises a midportion (2), and end portions (3,4) of different lengths (S, S$_1$) joined to the midportion (2) by their ends. Other ends of the end portions (3, 4) of the blade have eyes (7, 8) to receive elements of pivotable connections of the spring blade with longitudinal axes (9, 10) of these eyes substantially perpendicular to the plane of arrangement of the neutral line (11) of the resilient blade (1) passing through the centers (15, 17) of gravity of its transverse sectional planes (5, 6).

7 Claims, 3 Drawing Sheets

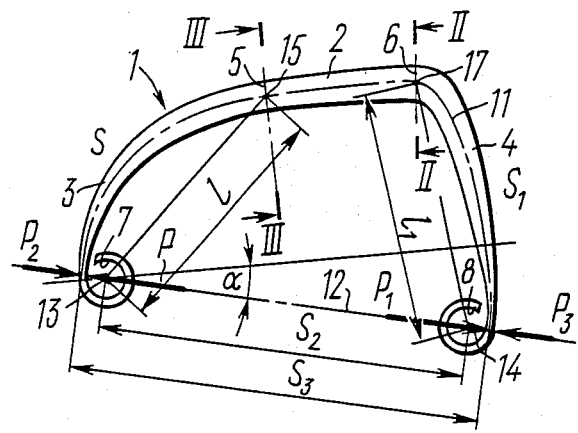
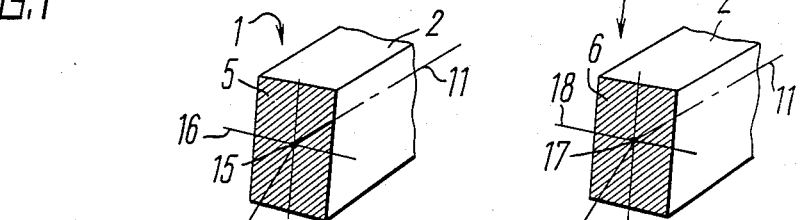
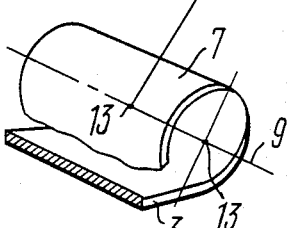
FIG.2
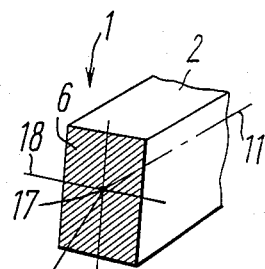
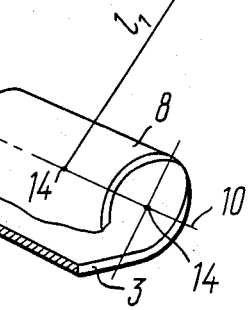
FIG.3

ZAMITTER BLADE SPRING

BACKGROUND OF THE INVENTION

1. Field of the Invention

This invention relates generally to the construction of resilient elements, and more particularly to blade springs.

2. Description of the Prior Art

The ever growing number and variety of motor vehicles produced makes it very important to expand the functional capabilities of resilient suspension elements, such as plate or blade springs.

There is known a Zamitter blade spring (cf., e.g., USSR Inventor's Certificate No. 1,040,244, Int. Cl. F. 16 F 1/18, published 1980) made from a resilient plate or blade having variable cross-sectional dimensions in terms of the length of the blade and comprising a midportion, and end portions joined to the midportion by their ends, other ends of the end portions having eyes for receiving elements of pivotable connections of the blade spring with axes of the eyes being perpendicular to the plane of the neutral line of the resilient blade passing through the centers of gravity of the cross-sections. In this blade spring the end portions of the resilient blade have equal length.

However, in a number of instances, such as in the front suspension of a truck, the required length of the end portions of the resilient blade is limited by the floor of the truck body, whereas the overall length of the spring is limited by the adjacent chassis units, that is confined by the space congested with other parts of the truck chassis. (Conversely, reduced length of the end portions of the resilient blade, or shorter overall length of the spring blade affects the spring compliance.

SUMMARY OF THE INVENTION

It is therefore an object pof the present invention to provide a Zamitter blade spring having end portions thereof such relative length as to expand its functional capabilities and improve its relative compliance.

The object of the invention is attained by a Zamitter blade spring made from a resilient blade having variable cross-sectional dimensions in terms of the blade length and comprising a midportion and end portions joined to the midportion by their ends, other ends of the end portions having eyes for receiving elements of pivotable connections of the blade spring, axes of these eyes being perpendicular to the plane of arrangement of the neutral line of the resilient blade passing through the centers of gravity of its trnsverse cross-sectional planes. According to the invention, the end portions of the resilient blade are of different lengths.

Preferably, in the Zamitter blade spring the ends of the end portions of the resilient blade in which there are provided the eyes for receiving elements of pivotable connections of the blade spring are arranged so that the geometrical connecting line of the centers of the eyes for receiving elements of pivotable connections of the blade spring is at an angle to that part of the neutral line of the resilient blade, which passes along its midportion.

Desirably, the angle at which the geometrical connecting line of the centers of the eyes for receiving elements of pivotable connections of the blade spring relative to that part of the neutral line of the resilient blade, which passes along its midportion, is smaller than 90°.

Advisably, the ends of the end portions of the resilient blade in which the eyes for receiving elements of pivotable connections of the blade spring are provided are disposed so that the distances from the axes of these eyes for receiving elements of pivotable connections of the blade spring to the centers of gravity of the joint planes of its midportion with the corresponding end portions are equal.

Favourably, the ends of the end portions of the resilient blade having the eyes for receiving elements of pivotable connections of the blade spring are disposed so that the distance from the axis of the eye for receiving elements of pivotable connections of the blade spring of the end portion of greater length to the center of gravity of the joint plane of its midportion with this end portion is smaller or greater than the distance from the axis of the eye for receiving elements of pivotable connections of the blade spring of the end portion of smaller length to the center of gravity of the joint plane of its midportion with this end portion.

The present invention ensures accommodation of the blade spring in a motor vehicle in a congested space, which expands functional capabilities of the spring without affecting its compliance.

In addition, the invention allows to increase, at a predetermined load, the ratio of longitudinal deformation of the blade spring to its longitudinal dimensions, which enhances the relative compliance of the spring.

BRIEF DESCRIPTION OF THE DRAWINGS

Other objects and attending advantages of the invention will become more fully apparent from a more detailed description thereof taken in conjunction with the accompanying drawings, in which:

FIG. 1 is a general view of a blade spring according to the invention;

FIG. 2 is a section taken along the line II—II in FIG. 1 with a representation of an eye for receiving elements of pivotable connection of the blade spring at the end of the shorter end portion of the resilient blade;

FIG. 3 is a section taken along the line III—III in FIG. 1 with a representation of an eye for receiving elements of pivotable connection of the blade spring at the end of the longer portion of the resilient blade;

BEST MODE FOR CARRYING OUT THE INVENTION

Figure 5:
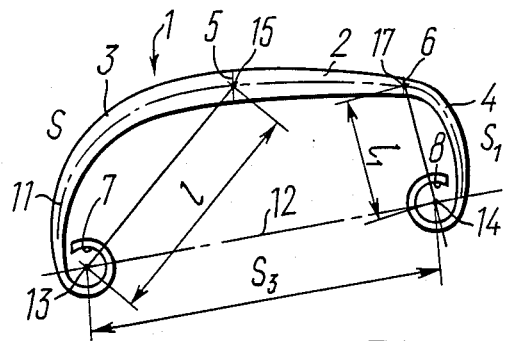
FIG. 5 is a general view of the blade spring with reference to FIG. 1 in the case, when the distance from the center of the eye for receiving elements of pivotable connection of the blade spring of the longer blade end portion to the point of intersection of the neutral line of the resilient blade with the neutral cross-sectional axis of the resilient blade in the joint plane of its midportion with this end portion is smaller than the distance from the center of the eye for receiving elements of pivotable connection of the blade spring of the shorter blade end portion to the point of intersection of the neutral line of the resilient blade in the joint plane of its midportion with this end portion.

A blade spring according to the invention is made from a resilient blade indicated generally by 1 in FIG. 1 and includes a midportion 2 to which there are joined ends of end portions 3 and 4 in joint planes 5 and 6, respectively. The length S of the end portion 3 is greater than the length $S_1$ of the end portion 4. The other or free ends of the end portions 3 and 4 of the blade 1 have eyes 7 and 8, respectively, to receive elements (not shown) to provide pivotable connection of the blade spring. Axis 9 (FIG. 2) of the eye 7, and axis 10 (FIG. 3) of the eye 8 are perpendicular to the plane of the neutral line 11 of the blade 1 extending through the centers of gravity of its transverse sectional planes. The geometrical connecting line 12 (FIG. 1) having a length $S_2$ between centers 13, 14 of eyes 7, 8 is at an angle $\alpha$, which is less than 90°, i.e. $\alpha < 90°$, to the part of the neutral line 11 extending through the midportion 2. The distance l from the longitudinal axis 9 of the eye 7 to the point 15 (FIG. 2) of intersection of the neutral line 11 with neutral sectional axis 16 of the blade 1 in the joint plane 5 of the portions 2 and 3 (which is the center 15 of gravity of the plane 5) is equal to the distance $l_1$ (FIG. 1) from the axis 10 of the eye 8 to the point 17 (FIG. 3) of intersection of the neutral line 11 with the neutral sectional axis 18 of the blade 1 in the joint plane 6 of the blade portions 2 and 4 (which is the center 17 of gravity of the plane 6). The neutral line passes through the centers 15 and 17 of gravity of the planes 5 and 6, respectively. FIG. 1 shows vectors of tensile forces P and $P_1$ directed away from each other, and vectors of compressive forces $P_2$ and $P_3$ directed toward each other along the line 12 and passing through the centers 13 and 14 of the eyes 7 and 8, respectively. The distance $S_3$ between the ends of the neutral line 11 is considered as the working span of the blade spring.

Figure 4:
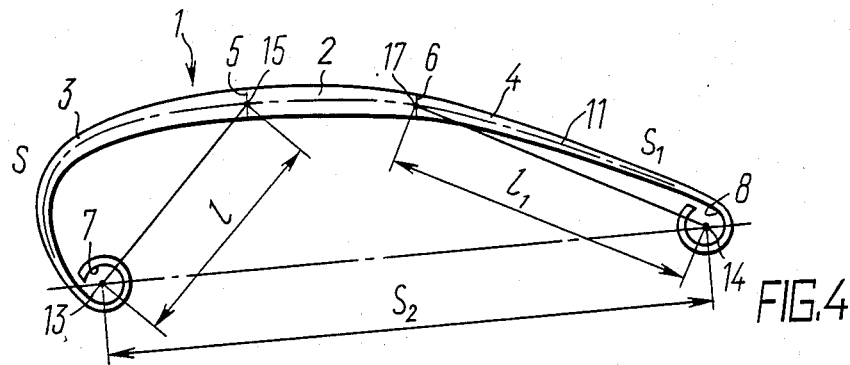
FIG. 4 is a general view of the blade spring with reference to FIG. 1 in the case, when the distance from the center of the eye for receiving elements of pivotable connection of the blade spring of the longer blade portion to the point of intersection of the neutral line of the resilient blade with the neutral cross-sectional axis of the resilient blade in the joint plane of its midportion with this end portion is smaller than the distance from the center of the eye for receiving elements of pivotable connection of the blade spring of the shorter portion to the point of intersection of the neutral line of the resilient blade in the joint plane of its midportion with this end portion.

According to another modified form of the blade spring, the distance l from the longitudinal axis 9 (FIGS. 1, 2, 4) of the eye 7 to the center 15 at the plane 5 is less than the distance $l_1$ from the longitudinal axis 10 (FIGS. 1, 3, 4) of the eye 8 to the center 17 at the plane 6, i.e. $l < l_1$ (FIG. 4). In other respects, this modification of the blade spring is similar to the aforedescribed.

According to one more embodiment of the blade spring, the distance l from the axis 9 (FIGS. 1, 2, 5) of the eye 7 to the center 15 at the plane 5 is greater than the distance $l_1$ from the axis 10 (FIGS. 1, 3, 5) of the eye 8 to the center 17 at the plane 6, i.e. $l > l_1$ (FIG. 5). Otherwise, this spring is structurally identical to the aforedescribed.

According to yet another modification of the blade spring, at $l > l_1$ (FIG. 5) the geometrical connecting line 12 (FIG. 6) between the centers 13 and 14 of the eyes 7 and 8 is parallel with the part of the neutral line 11 extending through the midportion 2 of the blade 1. In other respects, this construction of the blade spring is similar to the one represented in FIG. 5.

The Zamitter blade springs with reference to FIGS. 1, 2 and 3 operate in the following manner.

Figure 7:
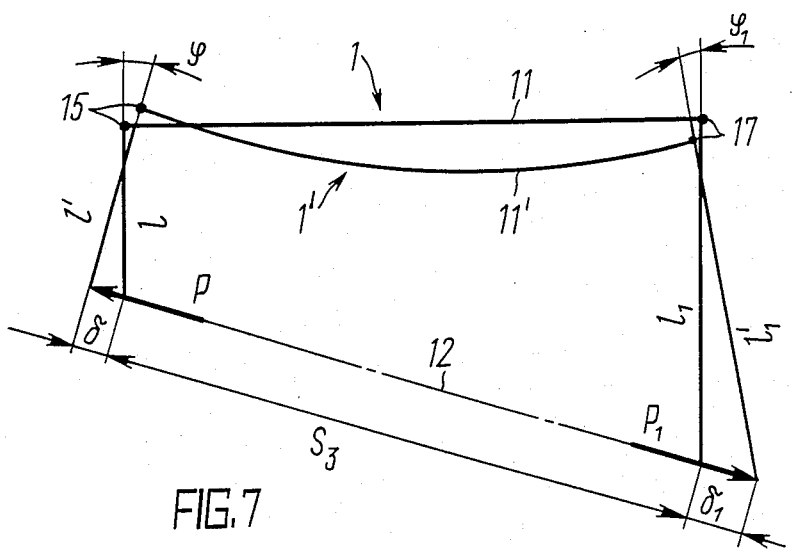
FIG. 7 shows schematically the blade spring at the point of deformation under the action of tensile forces.

Under the action of tensile forces P and $P_1$ the end portions 3 and 4 of the blade 1 depart to the deformation lengths $\delta$ and $\delta_1$ (FIG. 7). The midportion 2 of the blade 1 bends so that its neutral line 11 faces by its convexity the geometrical line 12. The length $S_2$ of the line 12 and the working span $S_3$ are caused to increase by a deflection f of the blade spring equal in magnitude to $$f \approx \delta + \delta_1.$$

Figure 8:
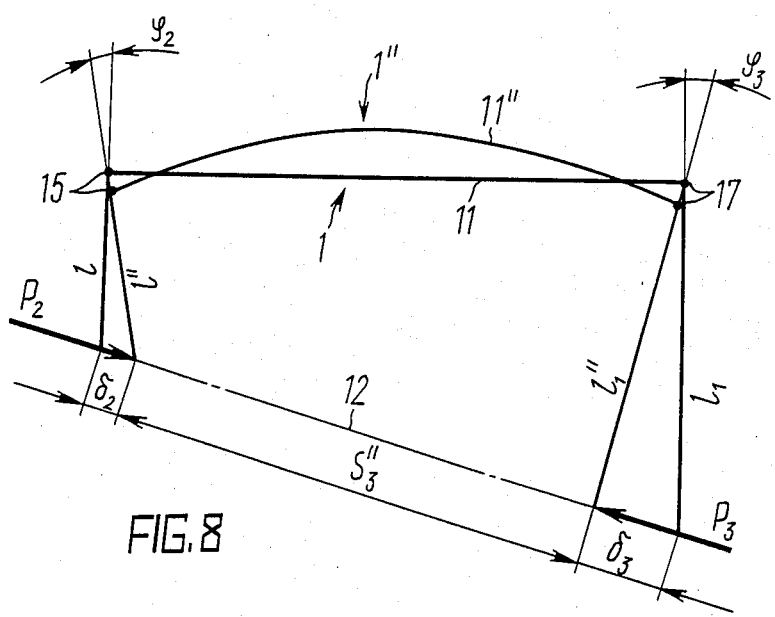
FIG. 8 shows schematically the blade spring at the point of deformation under the action of compressive forces.

Under the action of the compressive forces $P_2$ and $P_3$ the end portions 3 and 4 of the blade 1 are brought closer together to the deformation lengths $\delta_2$ and $\delta_3$, respectively (FIG. 8). Therewith, the portion 3 curves so that its neutral line 11 departs from the geometrical line 12. The working span $S_3$ and the length $S_2$ of the line 11 are reduced by the deflection $f_1$ equal to $$f_1 \approx \delta_2 + \delta_3.$$

With equality between the absolute magnitudes of the tensile forces P and $P_1$ and compressive forces $P_2$ and $P_3$ the deflections f and $f_1$ are also approximately equal, that is $$f \neq f_1.$$

Each deformation length $\delta$, $\delta_1$, $\delta_2$, and $\delta_3$ is in turn made up of deformation lengths $\delta_4$ and $\delta_5$ (not shown) resulting from bending of the blade portions 3 and 4 and their displacement caused by turning of these portions 3, 4, i.e. by turning the joint planes 5 and 6 under tension to the respective angles $\phi$ and $\phi_1$ (FIG. 7), and under compression to the respective angles $\phi_2$ and $\phi_3$ (FIG. 8). Therefore, the deformation lengths $\delta$ and $\delta_1$ under tension will be $$\delta \approx \delta_4 + \phi l$$

$$\delta_1 \approx \delta_5 + \phi_1 l_1.$$

In a likewise manner the deformation lengths $\delta_2$ and $\delta_3$ under compression by the forces $P_2$ and $P_3$ are:

$$\delta_2 \approx \delta_6 + \phi_2 l,$$

$$\delta_3 \approx \delta_7 + \phi_3 l_1 (\delta_6 \text{ and } \delta_7 \text{ not shown}).$$

The relative compliance $\bar{f}$ of the blade spring is determined by the ratio of the deflection f to the length $S_2$ of the line 11 or to the length of the working span $S_3$, that is $$\bar{f} = (f/S_2)$$

or $$\bar{f} = (f/S_3)$$

$$\bar{f} = (f_1/S_2)$$

or $$\bar{f} = (f_1/S_3).$$

The difference in the lengths S and $S_2$ of the blade portions 3 and 4, respectively, that is when $S>S_1$ at $l=l_1$, where l is the distance from the center 13 of the eye 7 to the center 15 of gravity of the plane 5 (FIG. 1), and $l_1$ is the distance from the center 14 of the eye 8 to the center 17 of gravity of the plane 6 (FIGS. 1 and 3), enables to accommodate the proposed blade spring in a vehicle where the space is conjested. In view of the foregoing, it is possible to accommodate the proposed blade spring in a range of working spaces, which expands the functional capabilities of the spring.

Figure 6:
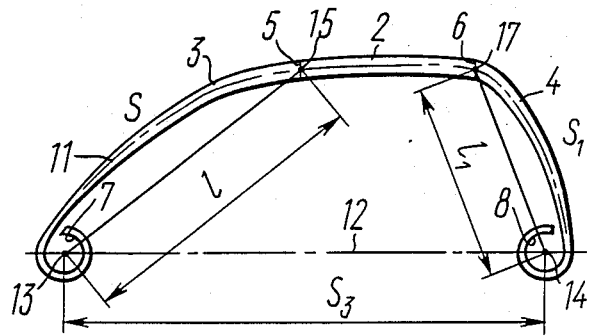
FIG. 6 is a general view of the blade spring with reference to FIG. 5 in the case, when the geometrical line between the centers of the eyes for receiving elements of pivotable connection is parallel with the neutral line of the resilient blade.

The Zamitter blade springs with reference to FIGS. 4, 5 and 6 operate substantially as heretofore described.

The expediency of the choice of the blade spring shown in FIG. 4, when $l_2<l_1$, or in FIG. 5 when $l>l_1$, or in FIG. 6, when $l>l_1$, and the geometrical line 12 is parallel with the neutral line 11 is dictated by the space available for its accommodation in a vehicle.

The present invention is also advantageous in that the relative compliance of the blade spring can be enhanced.

The invention can find application in suspensions of motor vehicles.

I claim:

1. A Zamitter blade spring made from a resilient blade having a length and having cross sections along the length thereof which define centers of gravity arranged in one plane and on one line which substantially corresponds to a neutral line of the spring, the linear dimensions of said resilient blade cross sections being variable along the length thereof, said resilient blade comprising a midportion and end portions joined to said midportion, said end portions having neutral lines which are divergent from a neutral line of said midportion to one side in their common plane, said end portions having free ends which include eyes for receiving elements to provide pivotable connections to the blade spring, longitudinally extending axes of said eyes being perpendicular to the plane containing the neutral line of the spring, said end portions (3, 4) of the resilient blade (1) being of different relative length $(S,S_1)$.

2. A blade spring as claimed in claim 1, characterized in that the free ends of the end portions (3, 4) of the resilient blade (1) in which the eyes (7,8) for receiving elements of pivotable connections of the blade spring are so arranged that a geometrical connecting line (12) of centers (13, 14) of the eyes (7, 8) is at an angle ($\alpha$) to that part of the neutral line (11) of the resilient blade (1) which passes along its midportion (2).

3. A blade spring as claimed in claim 2, characterized in that the angle ($\alpha$) is smaller than 90°.

4. A spring blade as claimed in claim 2, characterized in that the free ends of the end portions (3, 4) of the resilient blade (1) in which the eyes (7, 8) are provided are disposed so that the distances (l and $l_1$) from longitudinal axes (9,10) of the respective eyes (7,8) to the centers (15,17) of gravity of joint planes (5,6) of its midportion (2) with the corresponding end portions (3,4) are equal.

5. A spring blade as claimed in claim 2, characterized in that the ends of the end portions (3, 4) of the resilient blade (1) having the eyes (7, 8) are disposed so that the distance (l) from an axis (9) of one eye (7) of one end portion (3) of greater length (S) to a center (15) of gravity of a joint plane (5) of its midportion (2) with this one end portion (3) is different than the distance ($l_1$) from an axis (10) of another eye (8) of the other end portion (4) of smaller length ($S_1$) to a center (17) of gravity of a joint plane (6) of its midportion (2) with this other end portion (4).

6. A spring blade as claimed in claim 5, wherein the distance (l) is smaller than the distance ($l_1$).

7. A spring blade as claimed in claim 5, wherein the distance (l) is greater than the distance ($l_1$).

* * * * *